United States Patent [19]
Nakamura et al.

[11] Patent Number: 5,988,362
[45] Date of Patent: Nov. 23, 1999

[54] CURVED CONVEYOR

[75] Inventors: Tadahiko Nakamura; Toshinori Horikawa; Yoichi Takamoto, all of Kitakyushu, Japan

[73] Assignee: Thames Co., Ltd., Fukuoka-ken, Japan

[21] Appl. No.: 08/852,286

[22] Filed: May 7, 1997

[30] Foreign Application Priority Data

Dec. 21, 1996 [JP] Japan ..................................... 8-354892

[51] Int. Cl.⁶ ........................... B65G 23/34; B65G 15/02; B65G 23/00; B65G 23/04
[52] U.S. Cl. .......................... 198/831; 198/816; 198/832; 198/835
[58] Field of Search .................... 198/831, 816

[56] References Cited

U.S. PATENT DOCUMENTS

| 1,792,195 | 2/1931 | Stresau | 198/816 |
|---|---|---|---|
| 3,044,603 | 7/1962 | Fry | 198/831 |
| 3,217,861 | 11/1965 | Daniluk et al. | 198/816 |
| 3,951,256 | 4/1976 | Gurewitz | 198/831 |
| 4,846,338 | 7/1989 | Widmer | 198/831 |
| 4,930,621 | 6/1990 | Brown et al. | 198/831 |
| 4,955,466 | 9/1990 | Almes et al. | 198/831 |
| 5,022,514 | 6/1991 | Lofberg | 198/816 |
| 5,332,083 | 7/1994 | Axmann | 198/831 |
| 5,722,531 | 3/1998 | Zimny et al. | 198/831 |

FOREIGN PATENT DOCUMENTS

| 2663309 | 12/1991 | France . | |
|---|---|---|---|
| 3707558 | 9/1988 | Germany . | |
| 6-183534 | 7/1992 | Japan | 198/816 |
| 6-61831 | 9/1994 | Japan | 21/16 |
| 6-340315 | 12/1994 | Japan | 15/2 |
| 7-933 | 1/1995 | Japan | 13/8 |
| 8-179 | 2/1996 | Japan | 17/24 |
| 8-104411 | 4/1996 | Japan | 21/22 |
| 8-133438 | 5/1996 | Japan | 15/2 |
| 9401961 | 7/1996 | Netherlands . | |
| 683176 | 1/1994 | Switzerland . | |
| 2126973 | 4/1984 | United Kingdom . | |

*Primary Examiner*—William E. Terrell
*Assistant Examiner*—Joe Dillon, Jr.
*Attorney, Agent, or Firm*—Sughrue, Mion, Zinn, Macpeak & Seas, PLLC

[57] ABSTRACT

A curved conveyor includes an outer circumferential frame supported by L-shaped legs. An inner circumferential frame is supported in a cantilevered manner from the outer circumferential frame by means of horizontally extending beams connected between the inner circumferential frame and the outer circumferential frame. A drive-side tapered roller is rotatably supported at one end of the inner and outer circumferential frames and a lift-up section carrying a driven side tapered roller is pivotally supported at the opposite end of the inner and outer circumferential frames.

9 Claims, 7 Drawing Sheets

CURVED CONVEYOR

FIELD OF THE INVENTION

The present invention relates to a curved conveyor used for transferring or conveying goods in a curved direction while the goods are placed on a transfer belt thereof.

PRIOR ARTS

Recently, various kinds of conveyors suitable for production lines and types of goods to be transferred have been used in production lines in various kinds of industries. Furthermore, curved conveyors which convey products and materials in a curved direction are also used to change the transfer direction thereof with respect to limitations of production line or requirements in compliance with a workshop layout. Conventionally, as a curved conveyor to change the transfer direction of products and materials to be transferred, Japanese laid-open utility publication No. 61831 of 1994 discloses a bar conveyor, Japanese laid-open utility model publication No. 933 of 1995 discloses a curved accumulation conveyor, Japanese laid-open utility model publication No. 179 of 1996 discloses a floor chain conveyor, and Japanese laid-open patent publication No. 104411 of 1996 discloses a slat conveyor.

Furthermore, the followings are already known as a curved conveyor which conveys goods to be transferred in a curved direction with the goods placed on its transfer belt.

(a) a chain-driven curved conveyor comprising a frame formed to be arcuate, free rollers each rotatably supported at the end of the frame, a loop-shaped transfer belt spread to be like a fan between the free rollers, an arcuate chain travelling section disposed outwardly of the transfer belt, a chain disposed to be loop-like at the chain travelling section along the outer circumferential side of the transfer belt, a number of coil springs, one end of which is adapted to the outer circumferential edge of the transfer belt, and the other end of which is applied to the chain, wherein the transfer belt is adapted to rotate in line with the rotations of the chain.

(b) A curved conveyor, disclosed by Japanese laid-open patent publication No. 340315 of 1994, comprising free rollers respectively disposed at a predetermined interval, a loop-like transfer belt adapted between the free rollers, projections secured at a predetermined interval at the outer circumferential edge of the transfer belt, a pulley secured at both sides of the transfer belt at the outer circumferential edge and having a recess engageable with the projection, and a motor adapted to rotate the pulley.

(c) a curved conveyor, disclosed by Japanese laid-open patent publication No. 133438 of 1996, comprising a frame formed to be arcuate, tapered rollers respectively rotatably supported at the end of the frame, a loop-like transfer belt adapted to be arcuate along the frame between the tapered rollers, and a number of belt retaining devices having a body, for putting the thick part formed at the outer circumferential part of the loop-like transfer belt, which is attached to the fixing part positioned outwardly of the transfer belt and is at least partially made of a resilient member, a rotary body rotatably attached to the body and disposed inwardly of the loop of the transfer belt and a rotary body rotatably attached to the body and disposed outwardly of the loop of the transfer belt.

However, the abovementioned conventional conveyors have the following problems and shortcomings:

In a conveyor described in (a), there is a problem in that a number of components are used and the structure thereof is very complicated resulting in a lowering of the assembling efficiency. Furthermore, since a transfer belt is mounted at the chain by a number of coil springs there is another problem in that it is cumbersome to detach and re-assemble the transfer belt, whereas a great deal of manpower is required. There is still another problem in that since it is difficult to detach the transfer belt, cleaning of the transfer belt is carried out by wiping off the upper surface of the belt with the transfer belt attached, thereby causing good sanitation not to be secured in a case of conveying foodstuffs, etc. Still furthermore, since a great deal of manpower and costs are required if the washing thereof is carried out with the transfer belt removed, the working efficiency will be spoiled, resulting in a lowering of the productivity, whereby a further problem exists in the maintenance thereof.

In a conveyor described in (b), since the transfer belt is adapted to be rotated by engagement of projections secured at a predetermined interval at the outer circumferential edge of the transfer belt with a pulley having recesses engageable with the projections, there causes such a problem where the engagement of the projections with the recesses of the pulley slips due to elongation, etc. of the transfer belt. Furthermore, since there is a necessity to remove the pulley, etc., in order to detach the transfer belt, a great deal of time and manpower are required, resulting in a lowering of the working efficiency, whereby the productivity may be suppressed. That is, the cleaning can not be carried out with the transfer belt detached. Therefore, the cleaning is carried out by only wiping off the upper surface of the transfer belt, thereby causing good sanitation not to be secured in a case of conveying foodstuffs, etc.

In a conveyor described in (c), there is a problem in that since the outer circumferential edge of the transfer belt is put between a number of rotational members, a number of components are used and the structure thereof is very complicated, resulting in a lowering of the mass production efficiency and an increase of the cost thereof. Furthermore, since the outer circumferential edge of the transfer belt is put by the belt retaining devices, a great deal of time and manpower are required to detach the transfer belt, and the productivity is suppressed. Furthermore, since usually it is impossible to clean up the transfer belt after it is removed, the cleaning is carried out for only the upper surface of the transfer belt. Accordingly, there is another problem in that sanitation can not be secured in a case of conveying foodstuffs.

The invention is to solve these and other problems existing in the conventional arts, and it is therefore an object of the invention to provide a curved conveyor which has a few of components, and is simple in structure, excellent in maintenance, cheap in production and excellent in mass production efficiency, and in which the transfer belt can be easily detached therefrom and attached thereto, can be easily washed and cleaned up, and can be kept sanitary to thereby keep foodstuffs, etc. very sanitary during the transfer.

SUMMARY OF THE INVENTION

In order to achieve the above object, a curved conveyor according to the invention comprises (a) an outer circumferential frame, (b) an L-shaped leg mechanism attached to said outer circumferential frame, (c) a cover part detachably disposed on the upper surface of said outer circumferential frame, (d) an inner circumferential frame connected to said outer circumferential frame via beams, (e) a drive-side tapered roller pivotally supported at one end of said outer and inner circumferential frames, (f) a lift-up section disposed so as to be turned at the other end of said outer and inner circumferential frames, (g) a driven-side tapered roller rotatably axially supported at said lift-up section, (h) a loop-like transfer belt extending between said drive-side tapered roller and said driven-side tapered roller and having engaging parts which are formed, at the outer circumferential side edge of said transfer belt, outwards of the outer circumferential edge of said drive-side tapered roller and said driven-side tapered roller. With the above construction, since the L-shaped leg mechanism is disposed at the outer circumferential frame and no leg is provided at the inner circumferential side, such legs do not constitute any hindrance for detaching and attaching the transfer belt, thereby causing the detaching and attaching thereof to be made easy. Furthermore, the driven-side tapered roller is pivotally supported at the lift-up section disposed so as to be turned at one end of the outer circumferential frame and inner circumferential frame. Therefore, it is possible to loosen the transfer belt adapted between the drive-side tapered roller and the driven-side tapered roller by causing the lift-up section to be rotated upwardly, thereby causing the transfer belt to be easily detached and attached. Furthermore, since the outer circumferential edge of the drive-side tapered roller and the driven-side tapered roller is disposed inner-circumferentially of the engaging part of the transfer belt, the side of the engaging part is brought into contact with the outer circumferential edge of the drive-side tapered roller and driven-side tapered roller, it is possible to prevent the transfer belt from moving inwardly.

BRIEF DESCRIPTION OF THE DRAWINGS

Other advantages of the invention will be readily appreciated as the same becomes better understood by reference to the following detailed description when considered in connection with the accompanying drawings wherein.

PREFERRED EMBODIMENTS OF THE INVENTION

Figure 1:
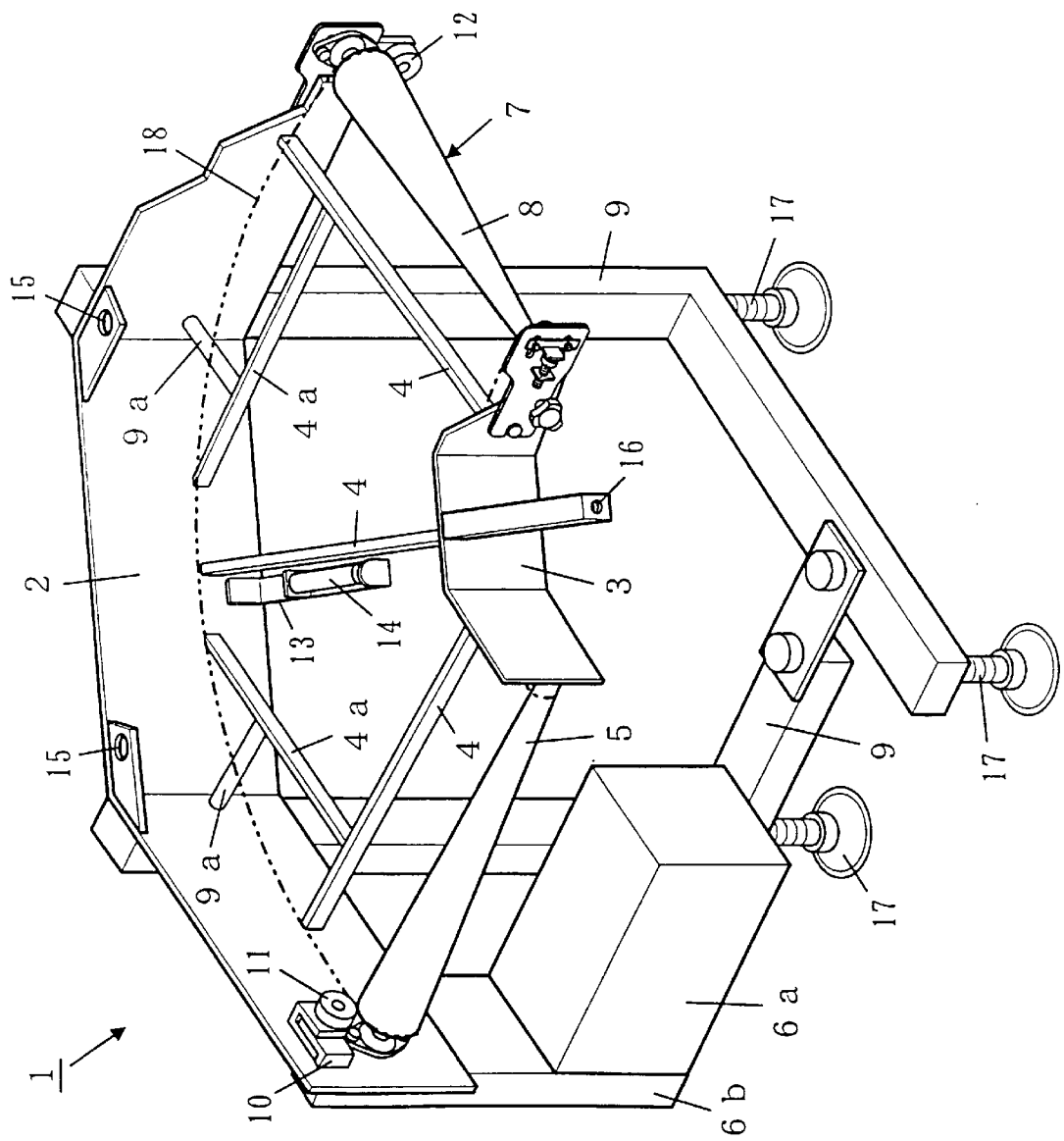
FIG. 1 is a perspective view of major parts of a curved conveyor according to the first preferred embodiment.

A curved conveyor according to the invention comprises (a) an outer circumferential frame, (b) an L-shaped leg mechanism attached to said outer circumferential frame, (c) a cover part detachably disposed on the upper surface of said outer circumferential frame, (d) an inner circumferential frame connected to said outer circumferential frame via beams, (e) a drive-side tapered roller pivotally supported at one end of said outer and inner circumferential frames, (f) a lift-up section disposed so as to be turned at the other end of said outer and inner circumferential frames, (g) a driven-side tapered roller rotatably axially supported at said lift-up section, (h) a loop-like transfer belt extending between said drive-side tapered roller and said driven-side tapered roller and having engaging parts which are formed, at the outer circumferential side edge of said transfer belt, outwards of the outer circumferential edge of said drive-side tapered roller and said driven-side tapered roller.

Therefore, since the legs disposed at the outer circumferential frame are formed to be L-shaped and no leg is provided at the inner circumferential side, such legs do not constitute any obstacle when detaching a transfer belt from a conveyor and attaching the same thereto, and it is possible to detach the transfer belt and attach the same without removing of the legs. Furthermore, since the driven-side tapered roller is pivotally supported at the lift up section disposed so as to be turned at one end of the outer circumferential frame and inner circumferential frame, it is possible to loosen the transfer belt adapted between the drive-side tapered roller and the driven-side tapered roller by only turning the lift-up section upwardly, and it is possible to detach the transfer belt from the conveyor and to attach the same thereto without removal of the drive-side tapered roller from the outer circumferential frame, etc. Still furthermore, since the outer circumferential edge of the drive-side tapered roller and the driven-side tapered roller is disposed inwardly of the engaging part of the transfer belt, the side part of the engaging part is brought into contact with the outer circumferential edge of the drive-side tapered roller and the driven-side tapered roller, it is also possible to prevent the transfer belt from moving inner-circumferentially when the curved conveyor is driven.

Herein, an engaging part of the transfer belt is such that it is formed to be made thick or to have a projection at the outer circumferential edge of the transfer belt, the side part of the engaging part is brought into contact with the outer circumferential edge of the drive-side tapered roller and the driven-side tapered roller, and the transfer belt can be prevented from moving inner-circumferentially when the corresponding curved conveyor is driven.

Furthermore, an arcuate fitting part corresponding to the shape of the engaging part which is brought into contact with the side of the engaging part of the transfer belt may be formed at the outer circumferential edge of the drive-side tapered roller and the driven-side tapered roller. Thereby, a wearing of the engaging part resulting from friction between the drive-side tapered roller and the driven-side tapered roller may be lightened.

A curved conveyor according to the invention is further provided with pressing rollers which cause the outer circumferential edge to be brought into contact with the inner circumferential side inwardly of the engaging part and are rotatably supported at predetermined positions of the outer circumferential frame.

Therefore, the transfer belt is prevented from being floated from the outer circumferential edge of the drive-side tapered roller and the driven-side tapered roller, and is simultaneously prevented from moving inner-circumferentially, when the curved conveyor is driven, by the outer circumferential edge of the pressing rollers being brought into contact with the engaging part of the transfer belt.

Herein, a rotary member such as a bearing, and a resin roller, etc. in which an arcuate fitting part engageable with the side of the engaging part is formed at the outer circumferential edge engageable with the side of the engaging part of the transfer belt may be used as a pressing roller. Furthermore, self-lubricating resin, etc., may be disposed at a predetermined position of the outer circumferential frame in engagement with the inner circumferential side of the engaging part of the transfer belt instead of the pressing roller.

A curved conveyor according to the invention is further constructed so that the lift-up section comprises a lift-up bracket disposed at the outer circumferential frame and the inner circumferential frame, a bearing part formed at one end of the lift-up bracket, on which the driven-side tapered roller is pivotally supported, a bracket fitting part formed at the other end of the lift-up bracket and consisting of a notched part or a grooved part pivotally and detachably adapted to the frame fitting part formed so as to protrude from the side of the outer circumferential frame and the inner circumferential frame, a bracket fixing part detachably fixed at the outer circumferential frame and the side of the inner circumferential frame at the lower part of the lift-up bracket, and a belt adjusting part for adjusting the tension of the transfer belt at the lift-up bracket.

Thereby, it is possible to loosen the transfer belt by only turning the lift-up bracket upwardly when detaching the transfer belt from the conveyor and attaching the same thereto since the lift-up bracket can be turned centering around the bracket fitting part, and it is possible to remove the lift-up section from the outer circumferential frame and the inner circumferential frame.

Furthermore, it is possible to cause the driven-side tapered roller to move by the belt adjusting part and to adjust the tension of the transfer belt extending between the drive-side tapered roller and the driven-side tapered roller.

Herein, the bracket fixing part may be such that the lift-up bracket is formed to be notched or grooved so as to turn centering around the bracket fitting part and the lift-up bracket is fixed at the outer circumferential frame and the inner circumferential frame by screwing of bolts.

Still furthermore, the belt adjusting part may be such that a screw-in part is secured at the side of the lift-up bracket, and the driven-side tapered roller and bearing part can be moved at the end of a bolt by screwing it in the screw-in part.

A curved conveyor according to the invention is still further constructed so that the lift-up section comprises a lift-up bracket having a supporting part rotatably supported at the outer circumferential frame and the inner circumferential frame, a bearing part formed at one end of the Lift-up bracket, at which the driven-side tapered roller is pivotally supported, a fixing screw disposed at the other end of the lift-up bracket, which is screwed in at the side of the outer circumferential frame and the inner circumferential frame, and a belt adjusting part for adjusting the tension of the transfer belt at the lift-up bracket.

Therefore, it is possible to loosen the transfer belt by only turning the lift-up bracket upwardly centering around the supporting part when detaching the transfer belt, and it is possible to detach the transfer belt from the conveyor and attach the same thereto.

Furthermore, the driven-side tapered roller can be moved by the belt adjusting part, whereby it is possible to adjust the tension of the transfer belt extending between the drive-side tapered roller and the driven-side tapered roller.

Herein, the belt adjusting part may be such that a screw-in part is disposed at the side of the lift-up bracket, and the driven-side tapered roller and bearing part can be moved at the end of a bolt with the bolt screwed in the screw-in part.

A curved conveyor according to the invention is constructed so that the pressing rollers are disposed at predetermined positions of the outer circumferential frame and the cover part.

Thereby, it is possible to remove the pressing rollers disposed at the cover part from the transfer belt together with the cover part when removing the cover part. Furthermore, by the pressing rollers being disposed at predetermined positions of the outer circumferential frame and the cover part, it is possible to prevent the transfer belt from being floated from the drive-side tapered roller and the driven-side tapered roller when the curved conveyor is driven, and it is possible to prevent the engaging part of the transfer belt from slipping off from the outer circumferential edge of the drive-side tapered roller and the driven-side tapered roller.

Herein, it is preferable that the pressing rollers at the transfer surface of the transfer belt disposed on the outer circumferential frame are detachably disposed at the outer circumferential frame because it is easy to detach the transfer belt from the curved conveyor and attach the same thereto.

A curved conveyor according to the invention is still further provided with a return side supporting roller rotatably and axially supported on the outer circumferential frame.

Thereby, the transfer belt can be prevented from being loosened at the non-transfer side, and it is advantageous in view of preventing the transfer belt from meandering.

Herein, the return side supporting roller is such that it may be in contact with the transfer belt or may be horizontal with respect to the transfer belt or may have inclination with respect thereto. Furthermore, in a case where the return side supporting roller is pivotally supported with some inclination provided downward of the inner circumferential side of the conveyor, the contacting area between the transfer belt and the return side supporting roller is decreased to thereby prevent the service life of the transfer belt due to friction between the transfer belt and the return side supporting roller from being lowered.

A curved conveyor according to the invention is further constructed so that the outer circumferential side of the outer circumferential frame is formed to be polygonal.

Therefore, the legs can be attached closely to the outer circumferential frame and no clearance is produced therebetween, it is advantageous in view of improving the stability of the corresponding curved conveyor. Furthermore, it is easy to attach the drive-side tapered roller, lift-up section, etc.

A curved conveyor according to the invention is still further constructed so that the cover part is provided with a notch-like or groove-shaped frame attaching part formed on the upper surface or side thereof.

Therefore, it is possible to detach the cover part from the conveyor or to attach the same thereto by only moving the cover part along the notch-like or groove-shaped frame attaching part.

A curved conveyor according to the invention is further provided with a small-diameter cross-over roller, which comprises a hook part formed at one end of the outer circumferential frame and the inner circumferential frame and/or at the lift-up section, a roller axis detachably disposed at the hook part and a roller part rotatably attached to the roller axis, and/or a base plate secured on the upper surface of the beam part.

Therefore, by employing a small-diameter cross-over roller, it is advantageous in view of reliable transfer of small goods between this curved conveyor and other conveyors connected thereto.

Furthermore, by providing a curved conveyor with a base plate, it is possible to prevent the transfer surface side of the transfer belt from being deflected due to the self weight of the transfer belt itself and the weight of goods to be transferred in a case where the curved conveyor is large-sized or the goods to be transferred is heavy.

Herein, the cross-over roller may be such that one or a plurality of rollers are attached to the roller axis.

(First preferred embodiment)

A description will be given of a first preferred embodiment of the invention with reference to the accompanying drawings.

FIG. 1 is a perspective view of major parts of a curved conveyor according to the first preferred embodiment.

In the drawing, 1 is a curved conveyor in the first preferred embodiment. 2 is the outer circumferential frame of the curved conveyor, the outer circumferential side of which is formed to be polygonal. 3 is the inner circumferential frame of the curved conveyor 1. 4 is a beam part fixed at a predetermined position of the outer circumferential frame 2 and the inner circumferential frame 3 and used for connecting them, 4a is a beam part fixed at the outer circumferential frame 2 and the beam part 4. Three beam parts 4 support the inner circumferential frame 3 in a cantilever manner since no support legs are provided for the inner circumferential frame. 5 is a drive-side tapered roller pivotally supported at one end of the outer circumferential frame 2 and the inner circumferential frame 3. 6a is a drive part connected to the drive transmission part such as a belt and chain at one end of the drive-side tapered roller 5 and adapted to rotate the drive-side tapered roller 5. 6b is a drive transmission part accommodating section for accommodating the drive transmission part. 7 is a lift-up section disposed so as to be turned at the other part of the outer circumferential frame 2 and the inner circumferential frame 3. 8 is a driven-side tapered roller, both ends of which are pivotally fixed at the lift-up section so as to be rotatable. 9 is a leg mechanism, each leg of which is formed to be L-shaped and fixed at the outer circumferential side of the outer circumferential frame 2. 9a is a leg attaching part disposed at the legs 9 and fixed at the beam part 4a, one end of which is fixed at the beam part 4 so as to be inserted into the outer circumferential frame 2. 10 is a pressing roller fixing part disposed upward of the drive-side tapered roller 5 of the outer circumferential frame 2. 11 is a drive-side pressing roller detachably disposed at the pressing roller fixing part 10 in order to press the transfer belt. 12 is a driven-side pressing roller pivotally supported at the outer circumferential frame 2 and disposed downward of the driven-side tapered roller 8. 13 is a return roller supporting part disposed downward of the outer circumferential frame 2. 14 is a return side supporting roller detachably disposed at the return roller supporting part 13. 15 is an outer circumferential side cover attaching part formed on the upper surface of the outer circumferential frame 2. 16 is an inner circumferential side cover attaching part fixed on the upper surface of the inner circumferential frame 3. 17 is a height adjusting part disposed beneath the bottom of the leg mechanism 9. 18 is a loop-like transfer belt extending between the drive-side tapered roller 5 and the driven-side tapered roller 8.

Figure 2:
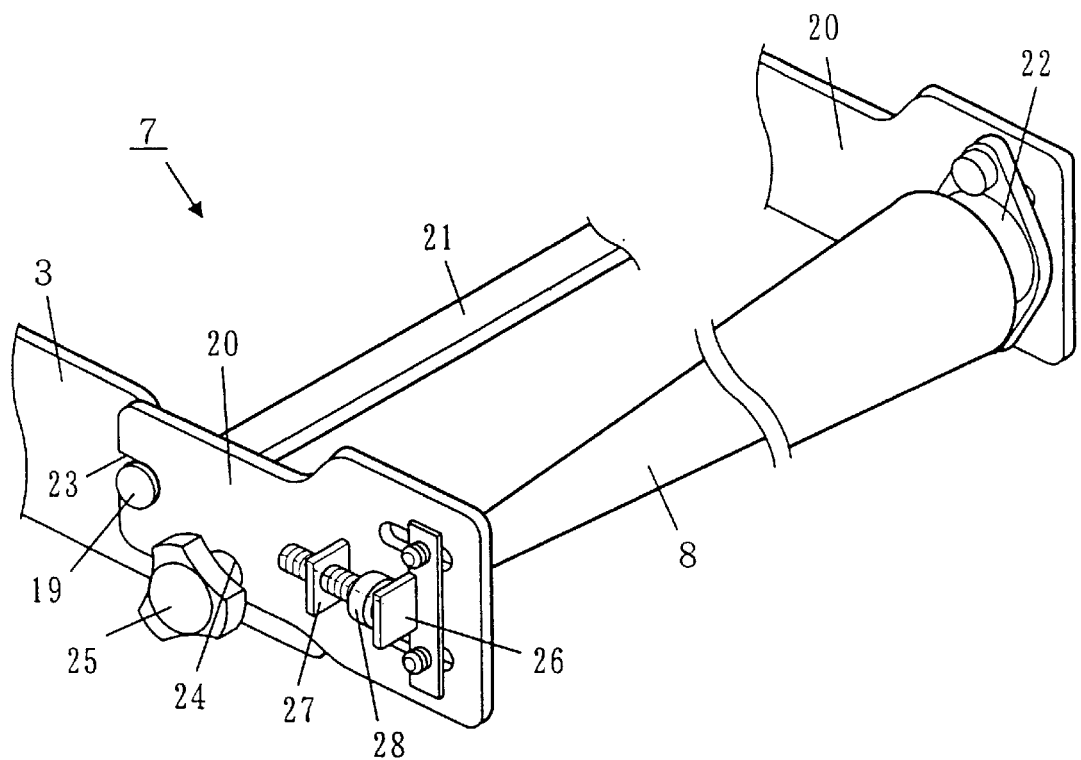
FIG. 2 is a perspective view of major parts, showing a state where the lift-up section of the first preferred embodiment is attached.

Next, a description will be given of the lift-up section 7 of the curved conveyor 1 with reference to the accompanying drawings FIG. 2 is a perspective view of major parts, showing a state where the lift-up section according to the first preferred embodiment is attached.

In the drawing, 19 is a frame fitting part projectingly formed at the side wall at the end side of the outer circumferential frame 2 and the inner circumferential frame 3. 20 is a lift-up bracket of the lift-up section 7, which is disposed so as to be adapted to the frame fitting part 19 of the outer circumferential frame 2 and the inner circumferential frame 3. 21 is a linkage part which connects lift-up brackets 20,20 of the lift-up section 7 to each other, 22 is a bearing part formed at one end of the lift-up bracket 20, at which the driven-side tapered roller 8 is pivotally supported so as to be rotatable. 23 is a bracket fitting part formed to be groove-shaped at the end of the lift-up bracket 20 and detachably adapted to the frame fitting part 19. 24 is a bracket fixing part which is formed to be groove-shaped downward of the lift-up bracket 20 and is used for detachably fixing the lift-up bracket 20 at the outer circumferential frame 2 or the inner circumferential frame 3. 25 is a fixing bolt with a knob, which is used for fixing the lift-up bracket 20 at the outer circumferential frame 2 or the inner circumferential frame 3. 26 is a belt adjusting plate fixed at the bearing part 22 via the lift-up bracket 20. 27 is a screw-in part formed at the lift-up bracket 20. 28 is a belt adjusting bolt screwed in the screw-in part 27 in a state where one end thereof is in contact with the belt adjusting plate 26.

A description will be given of detaching and attaching of a transfer belt of a curved conveyor according to the first preferred embodiment constructed as described above, with reference with the accompanying drawings.

Figure 3:
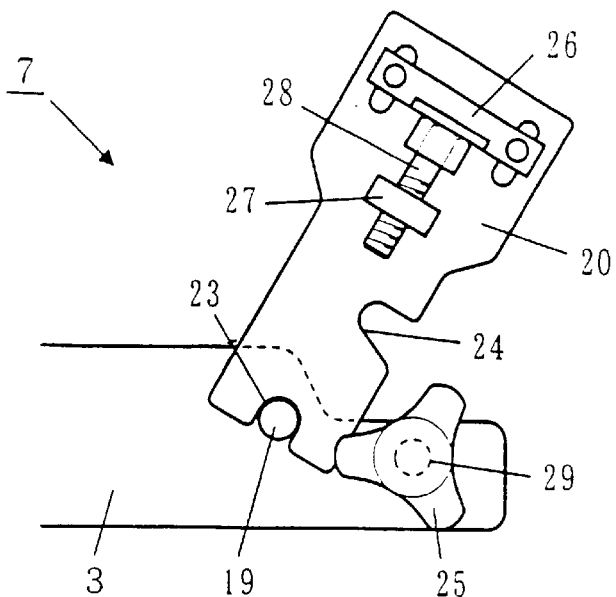
FIG. 3 is a side elevational view of major parts, showing a state where the lift-up section is turned upward.
Figure 4A:
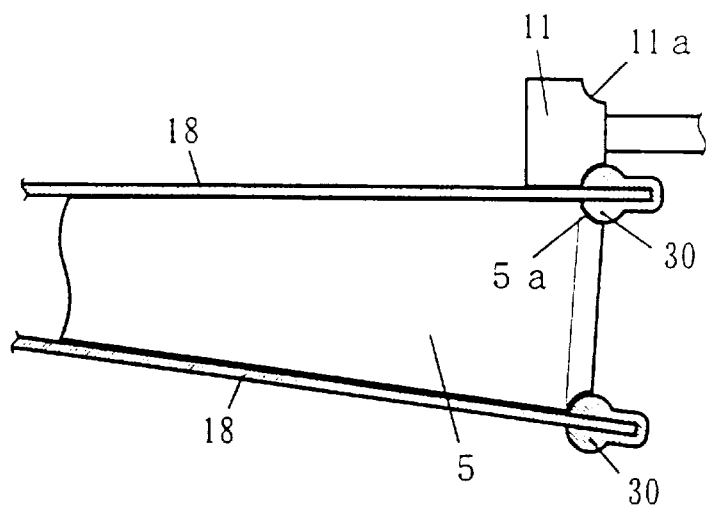
FIG. 4a is a cross-sectional view of major parts of a transfer belt adapted to the drive-side tapered roller.
Figure 4B:
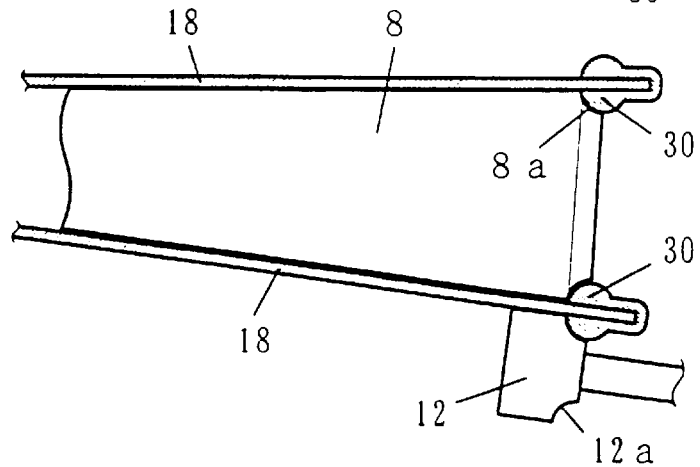
FIG. 4b is a cross-sectional view of major parts of a transfer belt adapted to the driven-side tapered roller.

FIG. 3 is a side elevational view of major parts, showing a state where the lift-up section is turned upwards, FIG. 4(a) is a cross-sectional view of major parts of the transfer belt adapted to the drive-side tapered roller, FIG. 4(b) is a cross-sectional view of the transfer belt adapted to the driven-side tapered roller.

In these drawings, 29 is a fixing part formed at the outer circumferential frame 2 and the inner circumferential frame 3, at which the lift-up bracket 20 is fixed by screwing fixing bolts 25. 30 is a thick wall type or projection-shaped engaging part formed at the outer circumferential edge of the transfer belt 18. 5a is a fitting part which is formed to be arcuate according to the shape of the engaging part 30 at the outer circumferential edge of the drive-side tapered roller 5 and is contact with the side part of the engaging part 30 of the transfer belt 18. 8a is a fitting part which is formed to be arcuate according to the shape of the engaging part 30 at the outer circumferential edge of the driven-side tapered roller 8 and is contact with the side part of the engaging part 30 of the transfer belt 18. 11a is a fitting part which is formed to be arcuate according to the shape of the engaging part 30 at the outer circumferential side of the drive-side pressing roller 11 and is contact with the side part of the engaging part 30 of the transfer belt 18. 12a is a fitting part which is formed to be arcuate according to the shape of the engaging part 30 at the outer circumferential side of the driven-side pressing roller 12 and is contact with the side part of the engaging part 30 of the transfer belt 18.

Furthermore, the drive-side tapered roller 5 and the driven-side tapered roller 8 may be, as shown in FIG. 4(a) and FIG. 4(b), a usual tapered roller or that having fitting parts 5a, 8a formed to be arcuate according to the shape of the engaging part 30 at the outer circumferential edge of these rollers 5 and 8, which is brought into contact with the side part of the engaging part 30 for the transfer belt 18.

Still furthermore, the drive-side pressing roller 11 and the driven-side pressing roller 12 may be, as shown in FIG. 4(a) and FIG. 4(b), a usual resin roller or that having fitting parts 11a, 12a formed to be arcuate according to the shape of the engaging part 30 at the outer circumferential edge of the transfer belt 18, which is brought into contact with the side of the engaging part 30 thereof.

When adapting the transfer belt 18 to a curved conveyor the drive-side pressing roller 11 is removed from the pressing roller fixing part 10, and as shown in FIG. 3, the lift-up section 7 is turned upward centering around the frame fitting part 19. Thereafter, as shown in FIG. 4(a), the engaging part 30 of the transfer belt 18 is disposed outward of the fitting part 5a of the drive-side tapered roller 5 and the engaging part 30 of the transfer belt 18 is disposed outward of the fitting part 11a of the drive-side pressing roller 11, whereby the drive-side pressing roller 11 is fixed at the roller fixing part 10 and the transfer belt 18 is mounted.

Herein, the non-transfer side of the transfer belt 18 is disposed on the upper surface of the return side supporting roller 14.

Next, the lift-up section 7 is turned centering around the frame fitting part 19, and the bracket fixing part 24 is matched to the fixing part 29. As shown in FIG. 4(b), the engaging part 30 of the transfer belt 18 is disposed outward of the fitting part 8a of the driven-side tapered roller 8, and further the engaging part 30 is provided outward of the fitting part 12a of the driven-side pressing roller 12, whereby the lift-up bracket 20 is fixed with fixing bolts 25 with a knob at the outer circumferential frame 2 and the inner circumferential frame 3 and the transfer belt 18 is adapted.

Furthermore, the driven-side tapered roller 8 is moved by adjusting the screw-in amount between the belt adjusting bolt 28 and the screw-in part 27, thereby adjusting the tension of the transfer belt 18.

Still furthermore, when removing the transfer belt 18, the drive-side pressing roller 11 is removed from the pressing roller fixing part 10, and the fixing bolt 25 is loosened in order to turn the lift-up section 7 upward centering around the frame fitting part 19. Still furthermore, the lift-up section 7 is removed from the frame fitting part 19, whereby the transfer belt 18 is removed from the inner circumferential frame 3 side.

Next, a description will be given below of the cover part of a curved conveyor 1 with reference to the accompanying drawings.

Figure 5:
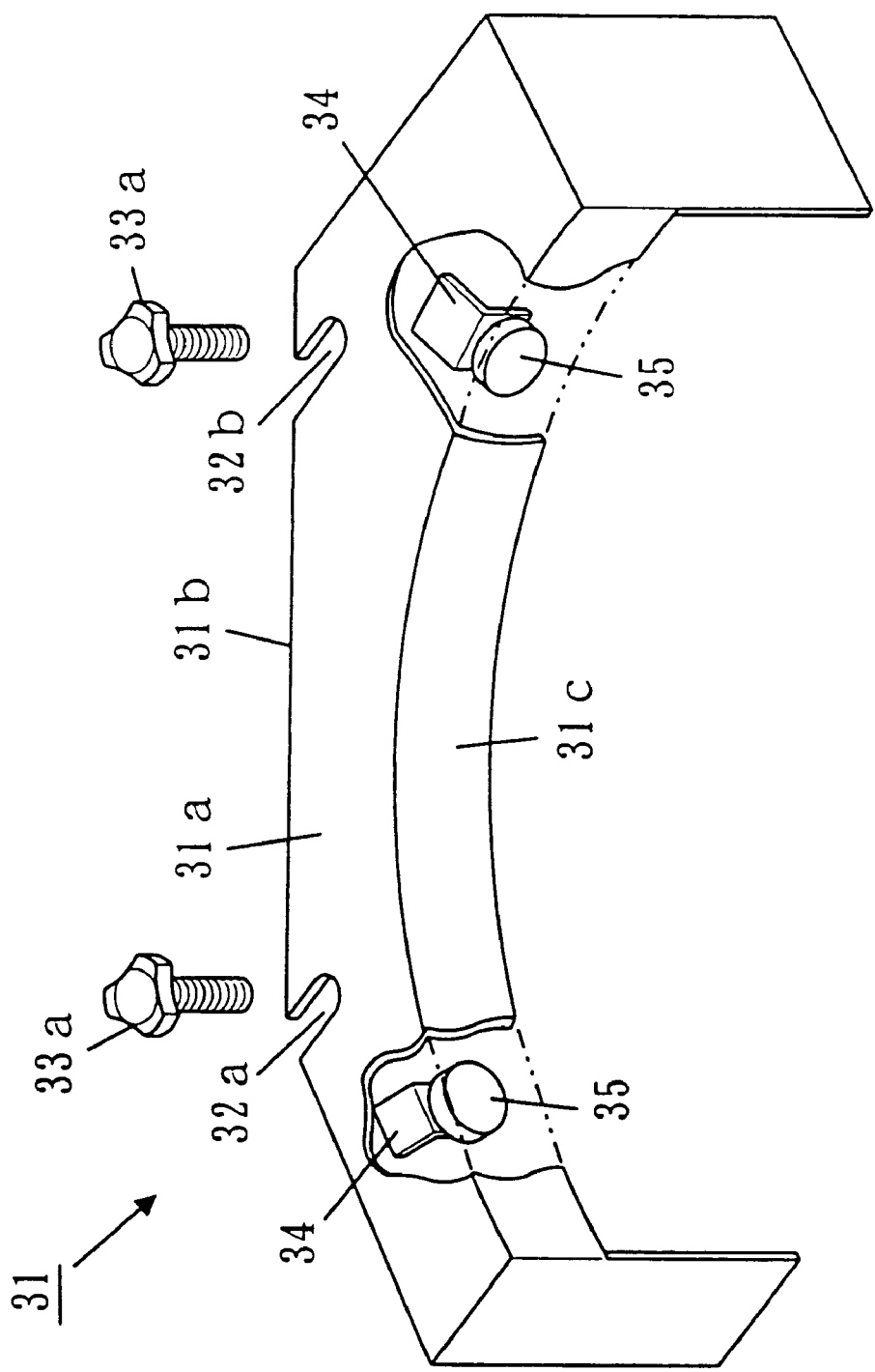
FIG. 5 is a perspective view of major parts of the outer circumferential side cover part.
Figure 6:
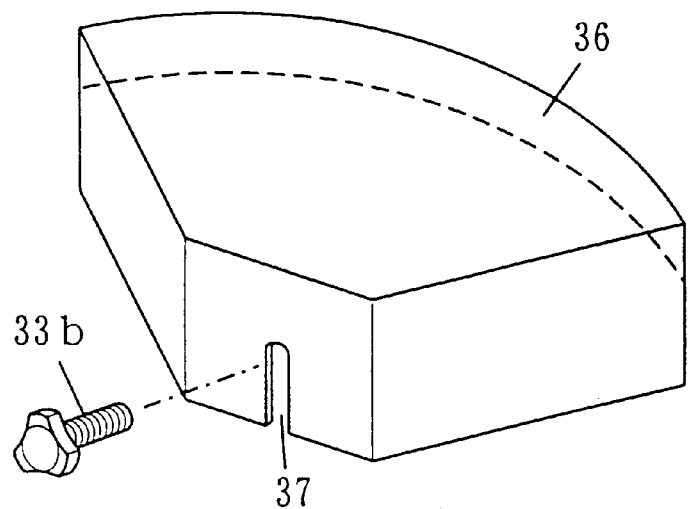
FIG. 6 is a perspective view of major parts of the inner circumferential side cover part.

FIG. 5 is a perspective view of major parts of the outer circumferential side cover, and FIG. 6 is a perspective view of major parts of the inner circumferential side cover.

In these drawings, 31 is an outer circumferential side cover part which is formed to be polygonal and is disposed on the upper surface of the outer circumferential frame 2. 31a is the upper surface of the outer circumferential side cover part 31. 31b is the outside part of the outer circumferential cover part 31 formed to be polygonal according to the shape of the outer circumferential frame 2. 31c is the inside part of the outer circumferential side cover part 31 formed to be arcuate. 32a and 32b are a frame attaching part formed to be groove-shaped in parallel to one direction of the upper surface 31a and detachably fixed at the outer circumferential side cover attaching part 15 (See FIG. 1). 33a is an outer circumferential side cover part fixing bolt with a knob for fixing the outer circumferential side cover part 31 at the outer circumferential side cover attaching part 15 of the outer circumferential frame 2. 34 is a transfer surface pressing roller attaching part disposed and fixed at a predetermined position of the rear surface of the upper plane 31a of the outer circumferential side cover part 31. 35 is a transfer surface pressing roller rotatably and axially supported at the transfer surface pressing roller attaching part 34. 36 is an inner circumferential side cover part formed to be fan-shaped and disposed on the upper surface of the inner circumferential frame 3. 37 is a frame attaching part which is formed to be groove-shaped at the side of the inner circumferential side cover part 36 and is detachably fixed with an inner circumferential side cover part fixing bolt 33b with a knob at the inner circumferential side cover attaching part 16 (See FIG. 1).

With respect to the outer circumferential side cover part 31 and the inner circumferential side cover part 36 constructed as described above, their detaching and attaching will be described below with reference to FIG. 1, FIG. 5 and FIG. 6.

The cover part fixing bolt 33a is screwed in the outer circumferential side cover attaching part 15, and by causing the outer circumferential side cover part 31 to slide in one direction from the driven-side tapered roller 8 side on the upper surface of the outer circumferential frame 2, the frame attaching parts 32a, 32b are fitted to the cover part fixing bolt 33a. Thereafter, the cover part fixing bolts 33a, 33a are screwed in the outer circumferential side cover attaching part 15 in order to fix the outer circumferential side cover part 31, whereby the outer circumferential side cover part 31 is supported by the top end of the outer circumferential frame 2 and the outer circumferential side cover attaching part 15. Furthermore, when removing the outer circumferential side cover part 31, the cover part fixing bolts 33a, 33a are loosened and the outer circumferential side cover part 31 is caused to slide on the upper surface of the outer circumferential frame 2, whereby the outer circumferential side cover part 31 is pulled out from the driven-side tapered roller 8 side.

The inner circumferential side cover part 36 is supported by the top end of the inner circumferential frame 3 and the cover part fixing bolt 33b in a state where the inner circumferential side cover part 36 is fixed, wherein the cover part fixing bolt 33b is screwed in the inner circumferential side cover attaching part 16, the inner circumferential side cover part 36 is attached from upward of the inner circumferential frame 3, the frame attaching part 37 is fitted to the cover part fixing bolt 33b, the cover part fixing bolt 33b is screwed in the inner circumferential side cover attaching part 16. Furthermore, when removing the inner circumferential side cover part 36, the inner circumferential side cover part 36 is pulled out upwards after the cover part fixing bolt 33b is loosened.

Next, a description will be given of a state where the outer circumferential side cover part 31 is attached to the curved conveyor 1, with reference to the accompanying drawings.

Figure 7:
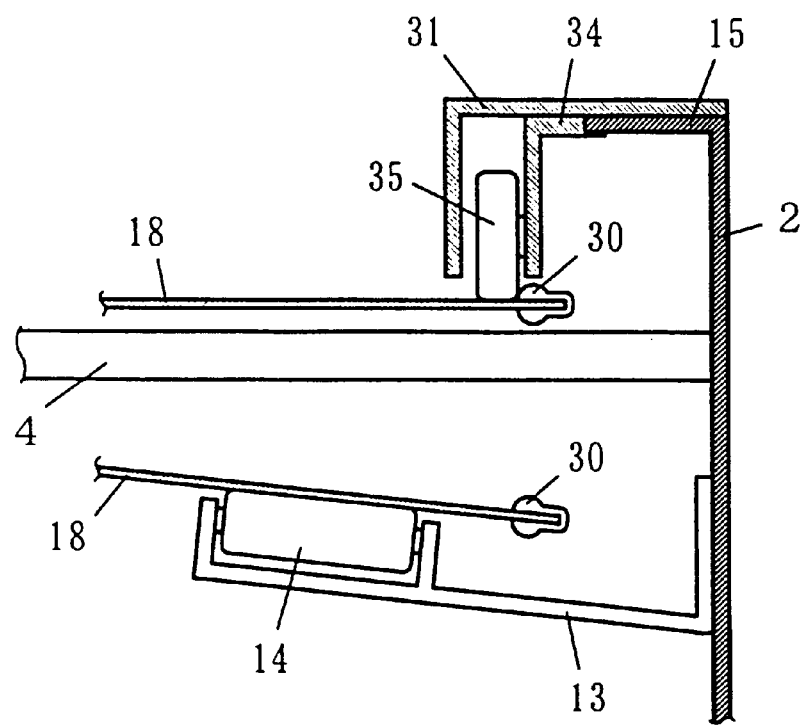
FIG. 7 is a cross-sectional view of major parts, showing a state where the outer circumferential cover part is attached.

FIG. 7 is a cross-sectional view of major parts showing a state where the outer circumferential side cover part is attached.

The transfer surface pressing roller 35 disposed on the outer circumferential cover part 31 is, as shown in FIG. 7, placed so that the outer circumferential edge is brought into contact with the inner circumferential side of the transfer belt 18 from the engaging part 30 thereof or the inner circumferential side of the engaging part 30 thereof.

Furthermore, the transfer surface pressing roller 35 may be a rotating body such as a bearing, or a resin roller, etc., having an arcuate fitting part, which is brought into contact with the side part of the engaging part 30 of the transfer belt 18, formed at the outer circumferential edge of the transfer surface pressing roller 35.

Still furthermore, the non-transfer surface of the transfer belt 18 is disposed on the upper surface of the return side supporting roller 14.

Since a curved conveyor according to the first preferred embodiment is constructed as described above, the same has the following actions.

a. To have an action by which since the legs are formed to be L-shaped and no leg is employed at the inner circumferential side, it is possible to detach a transfer belt from a curved conveyor and attach the same thereto by only removing the drive-side pressing roller and turning the lift-up section upward.

b. To have an action by which it is possible to adjust the tension of the transfer belt by using a belt adjusting bolt even after the transfer belt is adapted.

c. To have an action by which since the outer circumferential side of the outer circumferential frame is formed to be polygonal, each of the planes is flat and legs can be fixed closely to the plain outer circumferential frame with no clearance provided therebetween, and it is possible to support the curved conveyor in a stabilized state.

d. To have an action by which since the fitting part of the drive-side tapered roller, the fitting part of the drive-side pressing roller, the fitting part of the driven-side tapered roller, and the fitting part of the driven-side pressing roller are brought into contact with the side part at the inner circumferential side of the engaging part of the transfer belt, the transfer belt can be prevented from inner-circumferentially moving when the curved conveyor is driven.

e. To have an action by which the non-transfer surface of the transfer belt can be prevented from being deflected downward by placing the non-transfer surface of the transfer belt on the upper surface of the return side supporting roller, and the transfer belt can be prevented from meandering when the curved conveyor is driven.

f. To have an action by which since the transfer surface pressing roller is disposed at a predetermined position of the outer circumferential side cover part, the transfer surface of the transfer belt can be prevented from being floated when the curved conveyor is driven, and simultaneously the transfer surface pressing roller can be removed from upward of the transfer belt by only removing the outer circumferential side cover part when detaching and attaching the transfer belt, thereby improving the working efficiency of detaching and attaching the transfer belt.

g. To have an action by which since the frame attaching part of the outer circumferential side cover part and the inner circumferential side cover part is formed to be groove-shaped, it is possible to detach the outer circumferential side cover part or the inner circumferential side cover part by only loosening the cover part fixing bolt without removing all the cover part fixing bolts.

(Second preferred embodiment)

A curved conveyor according to the second preferred embodiment will be described below with reference to the accompanying drawings.

Figure 8:
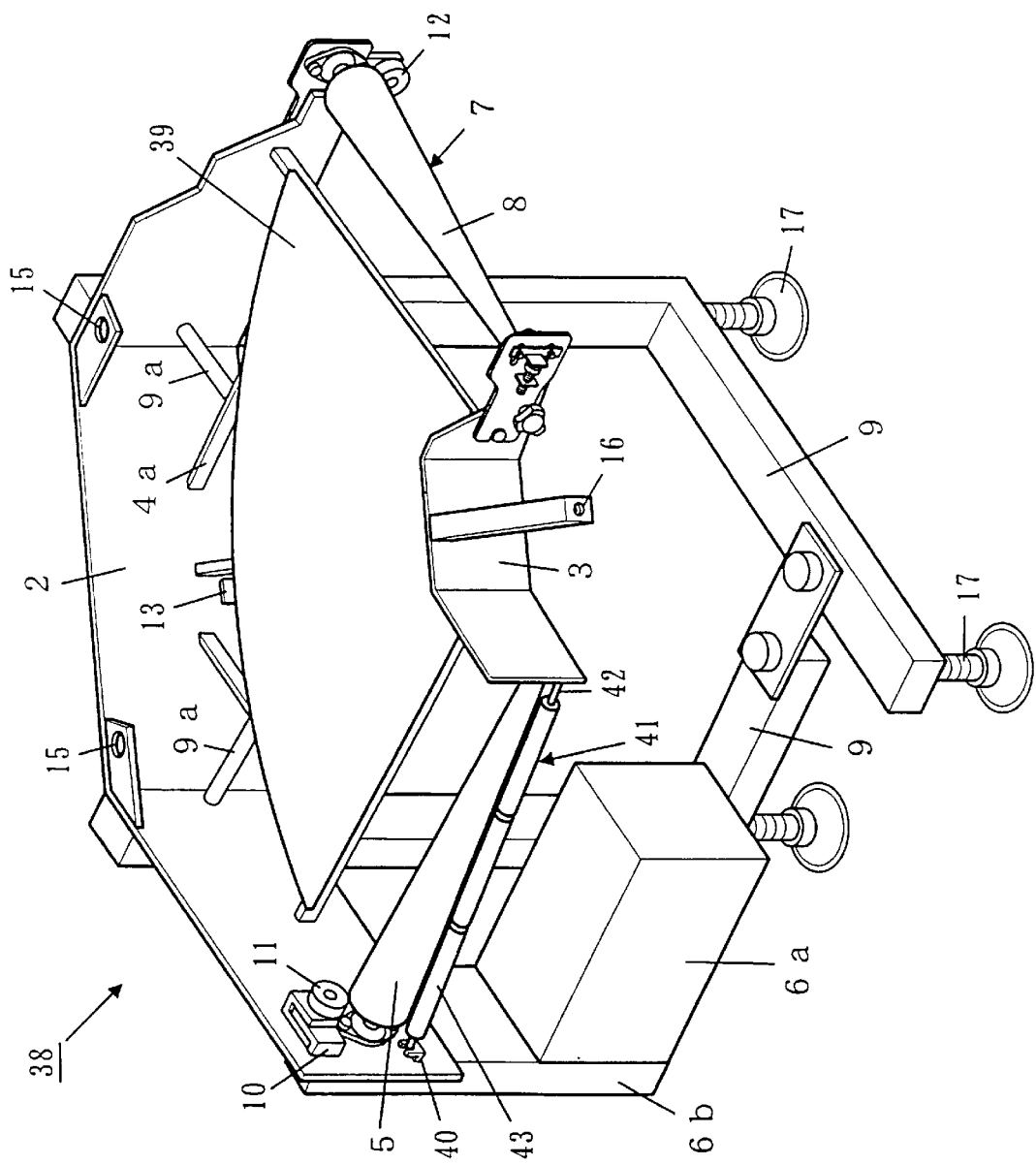
FIG. 8 is a perspective view of major parts of a curved conveyor according to the second preferred embodiment.

FIG. 8 is a perspective view of major parts of a curved conveyor according to the second preferred embodiment, wherein the parts which are identical to those of the first preferred embodiment are given the same reference numbers, and the description thereof is omitted.

In the drawing, 38 is a curved conveyor according to the second preferred embodiment. 39 is a base plate disposed on the upper surface of the beams 4. 40 is a hook part placed at the outer circumferential frame and the inner circumferential frame at the drive-side tapered roller 5 side. 41 is a cross-over roller supported at each end by the hook parts 40. 42 is a roller axis of the cross-over roller 41 detachably disposed at the hook part 40, and 43 is a plurality of roller parts rotatably inserted into the roller axis 42.

Herein, the cross-over roller 41 may be preferably such that one or a plurality of small-diameter rollers 43, the diameter of the outer circumference of which is 15 mm to 20 mm, are attached to the roller axis 42, whereby the transfer of small-sized goods to be transferred will be able to be easily carried out between the curved conveyor and another conveyor connected thereto.

Since a curved conveyor according to the second preferred embodiment 2 is constructed as described above and is provided with small-diameter cross-over rollers in addition to the actions of the first preferred embodiment, the curved conveyor has an action by which even though goods to be transferred are small-sized, they can be securely transferred onto a conveyor connected to the curved conveyor.

Furthermore, since the curved conveyor is provided with a base plate on the upper surface of the beams, it is possible to prevent the transfer surface of the transfer belt from being deflected in a case where goods to be transferred are heavy or the curved conveyor is large-sized.

Still furthermore, by a plurality of rollers being employed on the roller axis, the difference of the peripheral speed of the goods to be transferred, which are placed at the inner circumferential side and the outer circumferential side, can be decreased, and it is possible to prevent the direction or orientation of the goods from slipping when they are transferred.

(Third preferred embodiment)

Hereinafter, a description will be given below of the lift-up section of a curved conveyor according to the third preferred embodiment with reference to the accompanying drawings.

Figure 9:
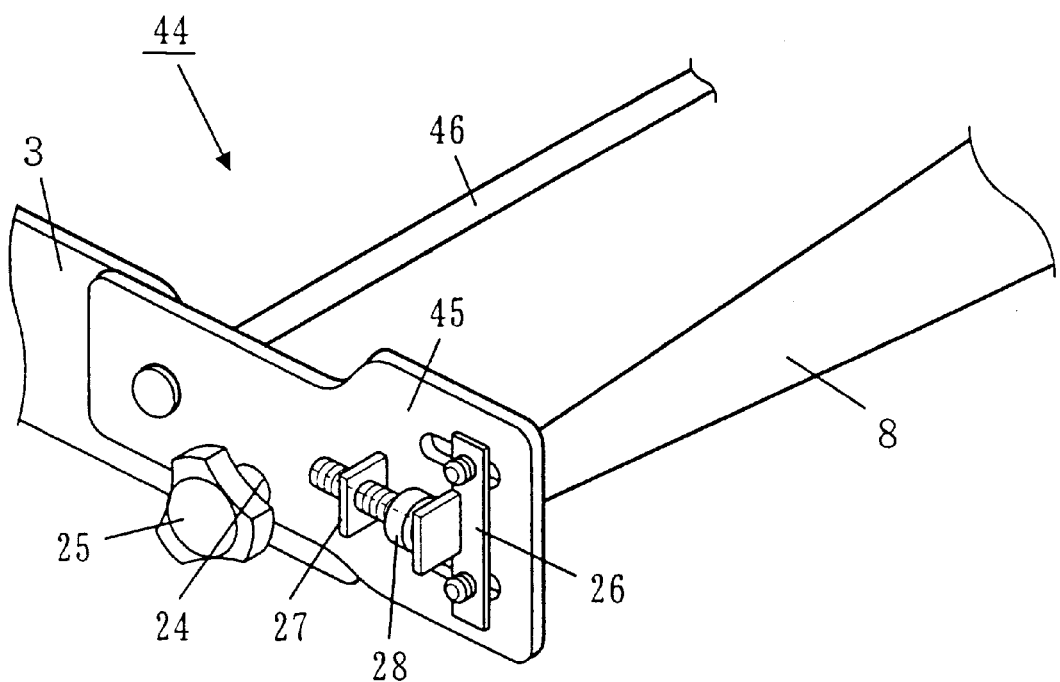
FIG. 9 is a perspective view of the lift-up section of a curved conveyor according to the third preferred embodiment.

FIG. 9 is a perspective view of major parts of the lift-up section of a curved conveyor according to the third preferred embodiment. Furthermore, the parts which are identical to those of the first preferred embodiment are given the same reference numbers, and the description thereof is omitted.

In the drawing, 44 is a lift-up section of the third preferred embodiment. 45 is a lift-up bracket axially supported so as to be turned on the outer circumferential frame 2 and the inner circumferential frame 3. 46 is a supporting part which connects the outer circumferential and inner circumferential lift-up brackets 45 to each other and pivotally supports the lift-up brackets 45 at the outer circumferential and inner circumferential frames.

Since the curved conveyor according to the third preferred embodiment is constructed as described above, the transfer belt can be detached from the conveyor body and attached thereto by only turning the lift-up section centering around the supporting part thereof without removing the same from the outer circumferential frame and inner circumferential frame in addition to the actions of the preferred embodiments 1 and 2, whereby it is very advantageous in view of improving the detaching and attaching efficiency of the transfer belt.

As described above, a curved conveyor according to the invention has the following excellent effects.

(1) Since the driven-side tapered roller is disposed at a turnable lift-up section and the legs are formed to be L-shaped with no leg provided at the inner circumferential side, the transfer belt can be easily detached from the curved conveyor at the inner circumferential side and attached thereto without requiring any conventional process of removing legs by only removing the drive-side pressing roller and turning the lift-up section upward. Therefore, it is possible to detach and attach the transfer belt in a short time to thereby enable the transfer belt to be easily washed, whereby it is possible to always keep the corresponding curved conveyor clean in a case where foodstuffs are transferred. Therefore, it is excellent in maintenance of the curved conveyor.

(2) Since the outer circumferential edge of the drive-side tapered roller and the drive-side pressing roller and the outer circumferential edge of the driven-side tapered roller and the driven-side pressing roller are brought into contact with the side part at the inner circumferential side of the engaging part of the transfer belt, it is possible to prevent the transfer belt from moving toward the inner circumferential side when the corresponding curved conveyor is driven, and it is possible to construct a curved conveyor with a greatly smaller number of components than in the conventional curved conveyors. Therefore, the structure is very simple and the production efficiency of curved conveyors is further improved with the production cost thereof much decreased.

(3) Since the lift-up section is detachably disposed so as to be turned at the outer circumferential frame and the inner circumferential frame, the lift-up section and the transfer belt can be easily detached from the curved conveyor and attached thereto. The curved conveyor is very advantageous in view of maintenance thereof.

(4) Since the lift-up section is provide with a belt adjusting part, it is possible to adjust the tension of the transfer belt after the same is installed. Accordingly, the assembling efficiency of the curved conveyor is improved.

(5) Since pressing rollers are provided at a predetermined position of the outer circumferential frame and the outer circumferential side cover part, it is possible to prevent the transfer belt from being floated when the corresponding curved conveyor is driven and to prevent the engaging parts of the transfer belt from coming off from the outer circumferential edge of the drive-side tapered roller and the driven-side tapered roller. Still furthermore, since the transfer surface pressing rollers are disposed at the outer circumferential side cover part, the transfer surface pressing rollers can be removed from upward of the transfer belt by only removing the outer circumferential side cover part when the transfer belt is detached from the curved conveyor. The detaching efficiency of the transfer belt is improved.

(6) Since the return side supporting rollers are provided at the outer circumferential frame, the non-transfer surface of the transfer belt can be supported with only a simple structure, whereby it is possible to prevent the transfer belt from meandering due to the non-transfer surface thereof being deflected downward.

(7) Since the outer circumferential side of the outer circumferential frame is formed to be polygonal, the legs can be fixed closely to the outer circumferential frame, and the stability of the corresponding curved conveyor is further improved. Simultaneously, it is very easy to manufacture the outer circumferential frame, to mount beams onto the outer circumferential frame, and to attach the drive-side tapered roller, lift-up section, etc. at a predetermined position. Accordingly, the assembling efficiency is excellent, whereby the production efficiency of conveyors is improved.

(8) By the frame attaching part of the outer circumferential side cover part and inner circumferential side cover part being formed to be groove-shaped, the outer circumferential side cover part and inner circumferential side cover part can be easily detached from the curved conveyor or attached thereto by only loosening the cover part fixing bolts without removing all the cover part fixing bolts. Therefore, the cover part can be very efficiently detached and attached, thereby causing the transfer belt to be easily detached and attached.

(9) Since small-diametered cross-over rollers are detachably provided at one end of the outer circumferential frame and inner circumferential frame and/or at the lift-up section, small goods to be transferred can be securely transferred onto another conveyor connected to the corresponding curved conveyor. Furthermore, they can be easily removed when detaching and attaching the transfer belt.

(10) Since a base plate is employed on the upper surface of the beam part, it is possible to prevent goods to be transferred from slipping which may result from a deflection of the transfer surface of the transfer belt in a case where the goods are heavy or the corresponding curved conveyor itself is large-sized.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A curved conveyor comprising: (a) an outer circumferential frame, (b) an L-shaped leg mechanism attached to said outer circumferential frame, (c) a cover part detachably disposed on the upper surface of said outer circumferential frame, (d) an inner circumferential frame connected to and supported solely from; said outer circumferential frame via cantilevered beams, (e) a drive-side tapered roller pivotally supported at one end of said outer and inner circumferential frames, (f) a lift-up section disposed so as to be turned at the other end of said outer and inner circumferential frames, (g) a driven-side tapered roller rotatably axially supported at said lift-up section, (h) a loop-like transfer belt extending between said drive-side tapered roller and said driven-side tapered roller and having engaging parts which are formed, at the outer circumferential side edge of said transfer belt, outward of the outer circumferential edge of said drive-side tapered roller and said driven-side tapered roller.

2. A curved conveyor as set forth in claim 1, further comprising a return side supporting roller rotatably axially supported on said outer circumferential frame.

3. A curved conveyor as set forth in claim 1, wherein the outer circumferential side of said outer circumferential frame is formed to be polygonal.

4. A curved conveyor as set forth in claim 1, wherein said cover part is provided with a notched or groove-shaped frame attaching part which is formed on the upper surface or at the side thereof.

5. A curved conveyor as set forth in claim 1, further comprising a small-diameter cross-over roller having hook parts formed at one end of said outer circumferential frame and said inner circumferential frame and/or at said drive-side tapered roller, a roller axis detachably attached to said hook part, and a roller rotatably attached to said roller axis, and a base plate disposed on an upper surface of said beams.

6. A curved conveyor as set forth in claim 1, further comprising pressing rollers which are brought into contact with the outer circumferential edge inwardly of said engaging parts and rotatably axially supported at a predetermined position of said outer circumferential frame.

7. A curved conveyor as set forth in any one of claims 1 and 6, wherein said lift-up section is provided with a lift-up brackets disposed at said outer circumferential frame and said inner circumferential frame, a bearing part formed at one end of said lift-up bracket, at which said driven-side tapered roller is pivotally supported, a bracket fitting part, consisting of a notched part, a grooved part, which is formed at the other end of said lift-up bracket and is detachably fitted so as to be turned in a frame fitting parts projectingly formed at the side of said outer circumferential frame and said inner circumferential frame, a bracket fixing parts which is detachably fixed at a fixing part formed at the side part of said outer circumferential frame and said inner circumferential frame at a lower part of said lift-up bracket, and a belt adjusting part disposed at said lift-up bracket in order to adjust the tension of said transfer belt.

8. A curved conveyor as set forth in any one of claims 1 and 6, wherein said lift-up section is provided with lift-up brackets having a supporting portion rotatably supported at said outer circumferential frame and said inner circumferential frame, a bearing part formed at one end of said lift-up bracket, at which said driven-side tapered roller is pivotally supported, fixing screws disposed at the other end of said lift-up bracket and screwed in a side part of said outer circumferential frame and said inner circumferential framer, and a belt adjusting part for adjusting the tension of said transfer belt at said lift-up bracket.

9. A curved conveyor as set forth in claim 2 wherein each of said pressing rollers are disposed at a predetermined position of said outer circumferential frame and said cover part.

\* \* \* \* \*